United States Patent
Ovadia

(10) Patent No.: US 11,748,691 B2
(45) Date of Patent: Sep. 5, 2023

(54) MULTI-THREAT MARITIME DETECTION SYSTEM

(71) Applicant: S.T.I. Security Technology Integration Ltd., Shefayim (IL)

(72) Inventor: Yuval Ovadia, Kibbutz Yagur (IL)

(73) Assignee: S.T.I. Security Technology Integration Ltd., Shefayim (IL)

( * ) Notice: Subject to any disclaimer, the term of this patent is extended or adjusted under 35 U.S.C. 154(b) by 649 days.

(21) Appl. No.: 16/461,026

(22) PCT Filed: Nov. 15, 2017

(86) PCT No.: PCT/IL2017/051248
§ 371 (c)(1),
(2) Date: May 15, 2019

(87) PCT Pub. No.: WO2018/092133
PCT Pub. Date: May 24, 2018

(65) Prior Publication Data
US 2019/0279153 A1    Sep. 12, 2019

Related U.S. Application Data

(60) Provisional application No. 62/422,289, filed on Nov. 15, 2016.

(51) Int. Cl.
*G06Q 10/08* (2023.01)
*G06Q 10/0833* (2023.01)
(Continued)

(52) U.S. Cl.
CPC ......... *G06Q 10/0833* (2013.01); *G06F 16/22* (2019.01); *G06Q 10/0832* (2013.01);
(Continued)

(58) Field of Classification Search
CPC .......... G06Q 10/0833; G06Q 10/0832; G06Q 50/28; G06F 16/22; G08B 21/12; G08B 21/18; G08B 25/10
(Continued)

(56) References Cited

U.S. PATENT DOCUMENTS

2003/0201394 A1* 10/2003 Peoples ................. B66C 19/002
                                                                    250/336.1
2004/0041706 A1*  3/2004 Stratmoen .............. G06Q 10/08
                                                                     340/539.26
(Continued)

FOREIGN PATENT DOCUMENTS

WO    WO 2018/092133         5/2018
WO    WO 2018/092133 A9      1/2019

OTHER PUBLICATIONS

International Preliminary Report on Patentability dated May 31, 2019 From the International Bureau of WIPO Re. Application No. PCT/IL2017/051248. (7 Pages).
(Continued)

*Primary Examiner* — Omar Casillashernandez

(57) ABSTRACT

A system adapted to collect security parameters from a shipping container while a container lifting mechanism is lifting and moving said container, comprising: a mount adapted to attach at least one sensor to a container lifting mechanism, wherein the at least one sensor is adapted to capture at least one sensor parameter associated with a shipping container while the container lifting mechanism lifts said shipping container; a network interface adapted to receive over a network at least one manifest parameter associated with the shipping container; at least one hardware processor adapted to execute code for detecting a mismatch between data deduced from an analysis of the at least one
(Continued)

sensor parameter and the at least one manifest parameter, and outputting a signal indicative of said mismatch.

20 Claims, 6 Drawing Sheets

(51) Int. Cl.
*G06F 16/22* (2019.01)
*G08B 21/18* (2006.01)
*G08B 25/10* (2006.01)
*G06Q 10/0832* (2023.01)
*G06Q 50/28* (2012.01)
*G08B 21/12* (2006.01)

(52) U.S. Cl.
CPC ............ *G06Q 50/28* (2013.01); *G08B 21/12* (2013.01); *G08B 21/18* (2013.01); *G08B 25/10* (2013.01)

(58) Field of Classification Search
USPC .......................................... 705/333; 702/333
See application file for complete search history.

(56) References Cited

U.S. PATENT DOCUMENTS

| 2005/0197844 | A1* | 9/2005 | Ng | ........................ G06Q 10/08 705/333 |
| 2005/0248456 | A1* | 11/2005 | Britton, Jr. | ............ G08B 21/12 340/506 |
| 2007/0276619 | A1* | 11/2007 | Sugahara | ................ B66C 13/16 702/82 |
| 2009/0201533 | A1* | 8/2009 | Ray | ........................ G06Q 10/08 358/1.15 |
| 2015/0046364 | A1* | 2/2015 | Kriss | .................. G06Q 10/0833 705/333 |
| 2015/0296105 | A1* | 10/2015 | De Geeter | ............... H04N 7/18 348/373 |
| 2016/0264292 | A1* | 9/2016 | Schoening | ........... B65D 57/003 |
| 2017/0242148 | A1* | 8/2017 | Yu | ........................ G06K 9/6211 |
| 2018/0144298 | A1* | 5/2018 | Rankin | .................. H04L 9/3236 |

OTHER PUBLICATIONS

International Search Report and the Written Opinion dated Jan. 24, 2018 From the International Searching Authority Re. Application No. PCT/IL2017/051248. (13 Pages).

* cited by examiner

MULTI-THREAT MARITIME DETECTION SYSTEM

RELATED APPLICATIONS

This application is a National Phase of PCT Patent Application No. PCT/IL2017/051248 having International filing date of Nov. 15, 2017, which claims the benefit of priority under 35 USC § 119(e) of U.S. Provisional Patent Application No. 62/422,289 filed on Nov. 15, 2016. The contents of the above applications are all incorporated by reference as if fully set forth herein in their entirety.

FIELD AND BACKGROUND OF THE INVENTION

The present invention, in some embodiments thereof, relates to a system for inspecting shipping containers and, more specifically, but not exclusively, to sensors attached to a container lifting mechanism that collects security parameters from a container while the container lifting mechanism is moving the container.

150-200 million containers pass between shipping container seaports each year. Due to cost and logistical issues, the percentage of containers inspected, physically or by technological means, is estimated at 2-3% of the total shipped containers.

The contents of the containers may comprise explosives, narcotics, weapons, chemicals, dirty bombs, people, counterfeit money, and more. One method of smuggling contraband in a container is an illegal use of legitimate customers (Trojan horse.

Most of the inspections are based on scanning technologies using X-ray, GAMA, sucking the air out of the container for a long period of time and testing it by technological detectors, and/or physical examination as the opening of the container which requires the presence of customs personnel.

In order to optimize the inspections mentioned above, there are a number of companies and programs that build a profile of containers by gathering information on the shipper and the recipient. The profile is designed to allow focusing inspection resources on the defined suspected containers. The problem with this method is that while profiled inspections are more likely than random inspections to locate security risks, it doesn't increase the number of inspections carried out. In addition, it is possible to bypass the physical or technological inspection by forging a profile.

SUMMARY OF THE INVENTION

According to an aspect of some embodiments of the present invention there is provided a system adapted to collect security parameters from a shipping container while a container lifting mechanism is lifting and moving the container, comprising: a mount adapted to attach at least one sensor to a container lifting mechanism, wherein the at least one sensor is adapted to capture at least one sensor parameter associated with a shipping container while the container lifting mechanism lifts the shipping container, a network interface adapted to receive over a network at least one manifest parameter associated with the shipping container, at least one hardware processor adapted to execute code for detecting a mismatch between data deduced from an analysis of the at least one sensor parameter and the at least one manifest parameter, and outputting a signal indicative of the mismatch.

Optionally, the hardware processor is further adapted to execute code for correlating the mismatch with a security category, wherein the correlation is calculated by at least one member of a list of techniques comprising statistical classification, correlation, linear regression, logistic regression, linear discriminant analysis, non-linear regression, and comparing an expected range of values with the detected mismatch.

Optionally, the hardware processor is further adapted to execute code for a database management system (DBMS) adapted to storing and instructing transmitting of the at least one sensor parameter.

Optionally, the at least one sensor comprises at least one member of a group consisting of weight sensors, length sensors, image sensors, barcode sensors, video recorders, gamma ray sensors, explosives sensors, radiation sensors, and hazardous material sensors, and wherein the at least one sensor parameter comprises parameters captured by a corresponding the at least one sensor.

Optionally, the analysis comprises at least one member of a list of analysis techniques comprising calculating at least one discrepancy between a value of the at least one sensor parameter and an expected range of values, calculating at least one discrepancy between a value of the at least one manifest parameter and an expected range of values, image processing, video content analysis (VCA), and optical character recognition (OCR).

Optionally, the mismatch comprises a discrepancy between the deduced data and the at least one manifest parameter greater than an expected value.

Optionally, the at least one manifest parameter comprises at least one of a list of parameters associated with the shipping container consisting of a subset of the at least one sensor parameter, shipping history, owner of the container, an identification number, owner of a contents of the container, a manifest of contents, identity of receivers, identity of senders, a shipping company responsible for delivery between any two points in the shipping history, and any other parameters associated with the shipping container.

Optionally, the hardware processor is further adapted to execute code for detecting a mismatch between data deduced from the analysis of the at least one manifest parameter and the analysis of the at least one sensor parameter.

Optionally, the hardware processor is further adapted to execute code for detecting a mismatch between data deduced from the analysis of a plurality of the at least one manifest parameters.

Optionally, the hardware processor is further adapted to execute code for detecting a mismatch between data deduced from the analysis of a plurality of the at least one sensor parameters.

Optionally, the mount comprises a connecting arm wherein a distal end is attached to the at least one sensor, and a proximal end is attached to the container lifting mechanism.

Optionally, the mount provides at least one degree of freedom between the at least one sensor and the container lifting mechanism.

Optionally, the mount comprises an electro-mechanical mechanism which automatically positions the sensor in proximity to at least one optimal position for detecting at least one the sensor parameter.

Optionally, mount automatically moves the sensor through a range of positions and orientations relative to the container lifting mechanism.

Optionally, the mount is controlled remotely by a user utilizing a controller interface.

According to an aspect of some embodiments of the present invention there is provided a system for collecting, storing, and distributing security parameters associated with a shipping container comprising: at least one computing processor comprising: a network interface adapted to receive over a network at least one sensor parameter from at least one sensor mounted on at least one container lifting mechanism and at least one manifest parameter associated with the shipping container, at least one hardware processor adapted to execute code instructions, the code instructions comprising a database management system (DBMS), and the DBMS adapted to receive queries for data associated with the shipping container, and to respond with the at least one sensor parameter.

More optionally, the at least one sensor comprises at least one member of a group consisting of weight sensors, length sensors, image sensors, barcode sensors, video recorders, gamma ray sensors, explosives sensors, radiation sensors, and hazardous material sensors, and wherein the at least one sensor parameter comprises parameters captured by a corresponding the at least one sensor.

More optionally, the at least one manifest parameter comprises at least one of a list of parameters associated with the shipping container consisting of a subset of the at least one sensor parameter, shipping history, owner of the container, an identification number, owner of a contents of the container, a manifest of contents, identity of receivers, identity of senders, a shipping company responsible for delivery between any two points in the shipping history, and any other parameters associated with the shipping container.

More optionally, the code instruction for detecting a mismatch between data deduced from an analysis of the at least one sensor parameter and an analysis of the at least one manifest parameter.

According to an aspect of some embodiments of the present invention there is provided a method for collecting security parameters from a shipping container while a container lifting mechanism is lifting and moving the container, comprising: mounting at least one sensor to a container lifting mechanism, wherein the at least one sensor is adapted to capture at least one sensor parameter associated with a shipping container while the container lifting mechanism lifts the shipping container, receiving the at least one sensor parameter, receiving over a network at least one manifest parameter associated with the shipping container, detecting a mismatch between data deduced from an analysis of the at least one sensor parameter and the at least one manifest parameter, and outputting a signal indicative of the mismatch.

More optionally, the at least one sensor comprising at least one member of a group consisting of weight sensors, length sensors, image sensors, barcode sensors, video recorders, gamma ray sensors, explosives sensors, radiation sensors, and hazardous material sensors, wherein the at least one sensor parameter comprising parameters captured by a corresponding the sensor.

More optionally, the at least one manifest parameter comprises at least one of a list of parameters associated with the shipping container consisting of a subset of the at least one sensor parameter, shipping history, ownership, an identification number, a manifest of contents, identity of receivers, identity of senders, a shipping company responsible for delivery between any two points in the shipping history, and any other parameters associated with the shipping container.

More optionally, the analysis of the at least one sensor parameter comprises at least one member of a list of analysis techniques comprising comparing values of sensor parameters with an expected range of values of sensor parameters, image processing, video content analysis (VCA), and optical character recognition (OCR).

More optionally, further comprising detecting the mismatch between data deduced from the analysis of the at least one manifest parameter and the analysis of the at least one sensor parameter.

More optionally, further comprising detecting the mismatch between data deduced from the analysis of a plurality of the at least one manifest parameters.

More optionally, further comprising detecting the mismatch between data deduced from the analysis of a plurality of the at least one sensor parameters.

More optionally, a security category is correlated with the mismatch, wherein the correlation is calculated by at least one member of a list of techniques comprising statistical classification, correlation, linear regression, logistic regression, linear discriminant analysis, non-linear regression, and comparing an expected range of values with the detected mismatch.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
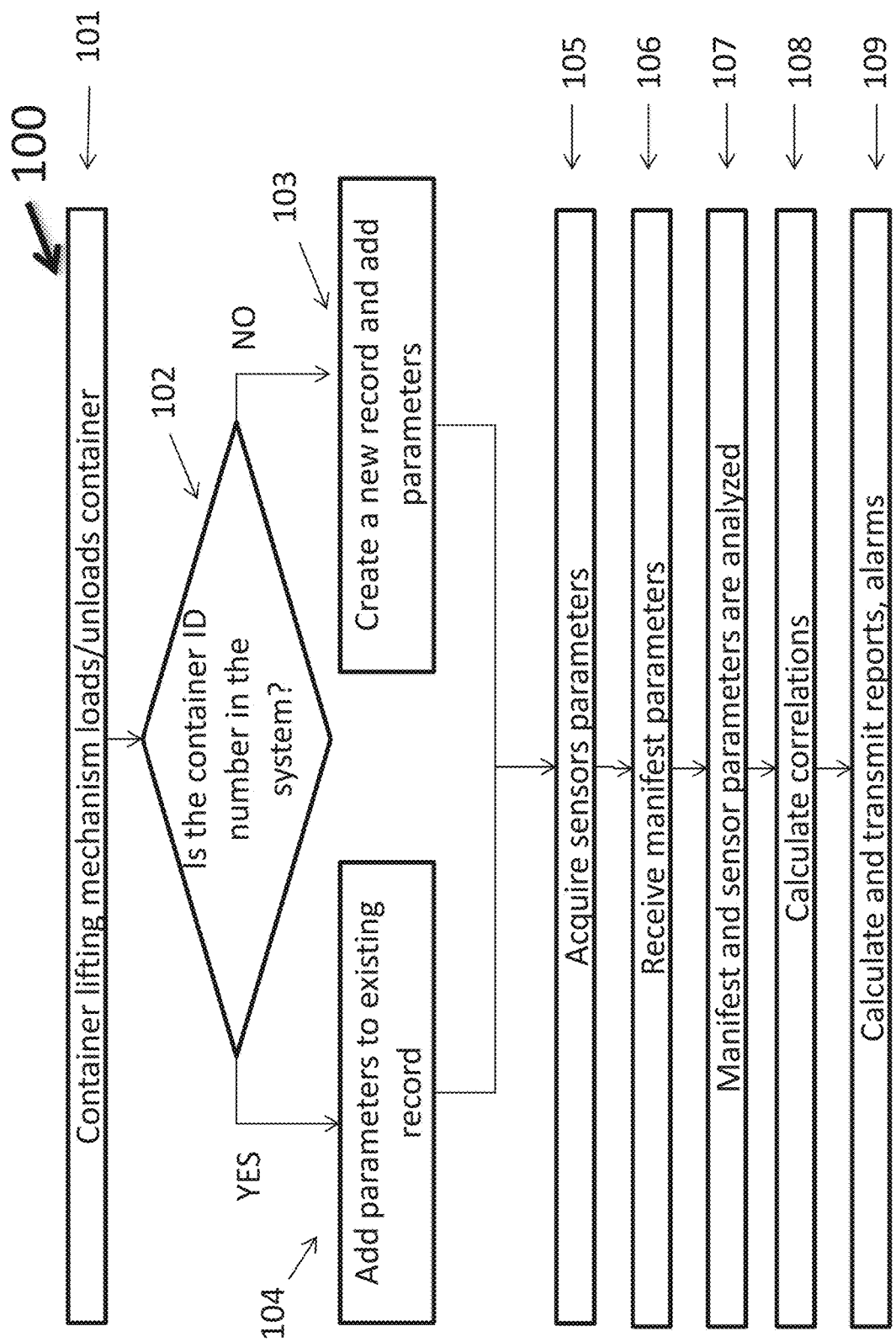
FIG. 1 is a flowchart of a process for inspecting containers based on sensor and documented data while being moved by a container lifting mechanism, according to some embodiments of the present invention.

The present invention, in some embodiments thereof, relates to a system for inspecting shipping containers and, more specifically, but not exclusively, to sensors attached to a container lifting mechanism that collects security parameters from a container while the lifting mechanism is moving the container.

The time it takes to inspect the shipping containers and the logistics of moving the container into and out of an inspection area is a problem for shipping companies and port operators. Container ports are designed to efficiently move containers from shore to ship and/or vice versa, and adding an inspection to this process increases both economic and logistical overhead. The present invention, in some embodiments thereof, comprises a system for inspecting a container during the time that a container lifting mechanism is moving the container from ship to shore and vice versa based on sensor and documented data.

The present invention, in some embodiments, is a system comprising one or more sensors attachable by a mount to a container lifting mechanism, a hardware (HW) processing platform, and networking interfaces.

The container lifting mechanism may be for example any type of crane, lifting mechanism, forklift and/or any other mechanism adapted to lift and/or move a shipping container.

A container may be a shipping container, an International Standards Organization (ISO) container, an intermodal container, and/or any other container that may be moved by a shipping container lifting mechanism.

The sensor(s) are adapted to collect a plurality of security related parameters from a container as the container is being moved by the lifting mechanism and transmitting the parameters to the hardware processing platform.

The hardware processing platform is adapted to receiving parameters associated with the container from the sensors and/or from network resources such as a shipping container database, to calculate report(s) from the received parameters that are descriptive of possible security and/or legal issues associated with the container, and to transmit specific report(s) to specific personnel, for example a report comprising detection of hazardous levels of radiation may be transmitted to a security officer, and a report describing taxable cargo within the container may be transmitted to a customs official.

The sensors may include image sensors, hazardous materials sensors, weight sensors, and the like, and may be attached to the lifting mechanism by an adjustable arm to allow collecting a plurality of parameters from a plurality of orientations relative to the container.

The hardware processing platform may further comprises a database (DB) and/or a management system (DBMS), for example stored in a non-volatile computer memory and/or stored remotely on a service cloud, that is adapted to receive, store, and/or transmit the parameters collected from the sensors, the calculated reports, and/or the parameters received from network resources.

By utilizing the time while a lifting mechanism performs loading and unloading of containers from a ship to a dock, and vice versa, the current invention, in some embodiments, enables the inspection of every container that passes through a shipping port without introducing delays or other logistical impediments to the port operations. By integrating a variety of types of sensors, the system is capable of inspecting a wide range of security related parameters. By connecting multiple systems to a networked DBSM, the collected parameters may be added to historical data from the container and other containers around the world to generate a database of container parameters that may be used to enhance security status calculation capabilities.

According to some embodiments of the present invention, container data collected in different ports from different lifting devices while containers are lifted allows mapping the location of containers in every given moment and to detect suspicious loading and unloading patterns, for example containers having an origin which does not match a geographical transport route and/or unexpected changes such as weight changes, color changes, and/or security risking flaws.

Before explaining one or more embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference is now made to FIG. 1, which is a flowchart schematically representing a process 100 for calculating and transmitting a security assessment for a shipping container as the container is being moved by a container lifting mechanism, according to some embodiments of the present invention.

The security assessment(s) may be calculated, for example by the hardware processor, from a variety of inputs comprising values of parameters received from sensors mounted on the container lifting mechanism, from historical data received from network resources, and/or from input by user(s). User input may be received for example via an interface to the hardware processing platform and/or from network resources.

Parameters received from the sensors which are installed on the container lifting mechanism are referred to herein as sensor parameters. Parameters from shipping certificates and/or other historical parameters may be received from network resources such as servers and other remote Computing Systems, and are referred to herein as manifest parameters The security assessment may comprise report(s), alarm (s), and/or security category(s). User input parameters may define the content and target network address(s) of each security assessment according to an intended recipient. Each security assessment may be transmitted to the intended recipient, for example by a network interface.

Reports may comprise a subset of the received parameter values and/or calculations based on the received parameter values. The calculation allows detecting a mismatch between sensor parameter(s) and manifest parameter(s) and/ or detecting suspicious patterns or routes based on a mismatch between current parameter(s) and historical parameter(s). Examples of mismatches are described below.

Alarms may comprise a type of report, for example a report that requires the recipient to perform an activity. For example, a security officer who receives an alarm descriptive of detection of a high level of hazardous material may be required to quarantine the associated container.

Security categories may comprise a numeral and/or a descriptive term representative of an assessment of a potential risk that the associated container may contain some form of contraband, for example explosives and/or counterfeit money, and/or one or more of the parameters associated with the container is incorrect, for example the ownership of the container may different than the parameter received from a network resource. For example, possible security categories may be numerals one through ten, where one represents zero risk, and ascending numerals represent ascending level of risk.

The security category may be calculated, for example by the hardware processing platform executing a correlation algorithm. The correlation algorithm may be for example a statistical classifier and/or a linear regression, which detects combinations of received parameters and/or mismatches between received parameters that are correlated with a specific security category.

Examples of mismatches include the following: a mismatch between values of a manifest parameter and a corresponding sensor parameter, for example a mismatch in the weight values or color values of the container. A mismatch may be detected based on logic rules applied to specific values of a specific group of manifest parameters, for example the combination of manifest parameter values of Libya as the port of origin, Liberia as the registered nationality of shipping company, and Russia as the country of the destination port may be detected as a mismatch due to historical security issues with this combination of values of manifest parameters. A mismatch may be detected between multiple historical manifest values representing the same container characteristic, for example a mismatch value manifest parameters representing the color of the container as recorded at origin and destination shipping ports, for instance by the image sensors attached to a container lifting mechanism at each location.

Figure 2:
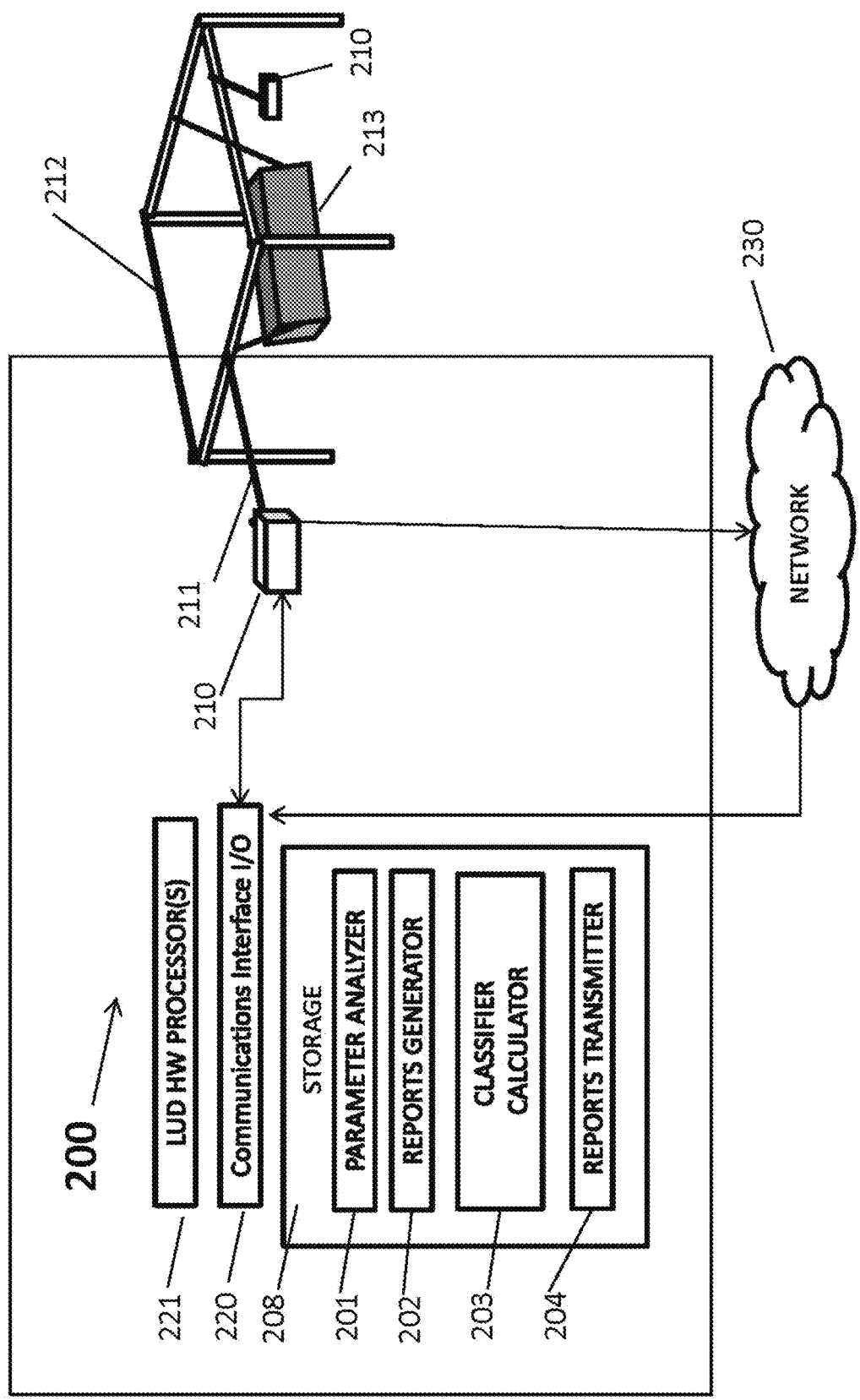
FIG. 2 is a schematic illustration of an exemplary system for inspecting containers based on sensor and documented data while being moved by a container lifting mechanism, according to some embodiments of the present invention.

Reference is now made to FIG. 2, a schematic illustration of exemplary Lifting Unit Device (LUD) 200 for collecting values of parameters from a container while the container is moved by a monitored container lifting mechanism, such as a crane, and optionally classifying the container based on correlations between the gathered sensor parameters and manifest parameters received from network resources, according to some embodiments of the present invention.

LUD 200 comprises a hardware processing platform comprising communications interface input/output (I/O) 220, LUD HW processor 221, and storage 208, and one or more mounts attaching one or more sensors 210 to a container lifting mechanism 212.

Sensor 210 collects sensor parameters from container 213 as container 213 is lifted and/or moved by container lifting mechanism 212. Sensors 210 may transmit an output signal representative of the collected parameters I/O 220 directly and/or via network 230. I/O 220 communicates the signals to LUD HW processor 221.

I/O 220, LUD HW processor 221, and storage 208 may comprise for example a server, a desktop computer, an embedded computing system, an industrial computer, a ruggedized computer, a laptop, a cloud computer, a private cloud, a public cloud, a hybrid cloud, and/or any other type of computing system. Optionally, LUD 200 comprises a virtual machine (VM) in place of I/O 220, LUD HW processor 221, storage 208.

Process 100 may be executed by LUD HW Processor 221 executing code from one or more software modules in storage 208, for example Parameter Analyzer module 201, Reports Generator module 202, Classifier Calculator module 203, Reports Transmitter module 204, and/or a DBMS module. The DBMS module may comprise code instructions for a database, a DBMS, a distributed database, and/or a distributed database management system (DDBMS).

Optionally, Process 100 may be executed remotely on a VM, a cloud computing platform, a Central Unit 500 as described below, and/or a Port Unit 550 as described below.

LUD HW processor 221 is adapted to receive and/or fetch sensor outputs such as signals from I/O 220 for executing the software modules. LUD HW processor 221 is adapted to fetch records, user input as described below, and/or other data from memory 208 as input(s) to executing the software modules.

Wherein a software module refers to a plurality of program instructions stored in a non-transitory medium such as storage 208 and executed by a processor such as processor 221.

LUD HW Processor 221 may comprise one or more processors, HW processor(s), multi-core processor(s), and/or any other type of core processing unit (CPU). Storage 208 may include one or more non-transitory persistent storage devices, for example, a hard drive, a Flash array and the like.

I/O 220 may be adapted to receiving to storage 208 sensor parameters, manifest parameters, reports, alarms and/or security categories. I/O 220 may be adapted to transmitting sensor parameters, manifest parameters, reports, alarms and/or security categories.

Optionally, I/O 220 may comprise one or more input interfaces, for example a keyboard, a soft keyboard, a touch screen, a graphical user interface (GUI), a voice to text system, and/or any other data input interface. I/O 220 may comprise one or more output interfaces, for example a screen, a touch screen, video display, and/or any other visual display device.

Optionally, I/O 220 may comprise a network interface card (NIC), a wireless router, and/or any other type of network interface adapted to communicating with network 230.

Network 230 may be any type of data network, for example, a local area network (LAN), a fiber optic network, an Ethernet LAN, a fiber optic LAN, a digital subscriber line (DSL), a wireless LAN (WLAN), a wide area network (WAN), a broadband connection, an Internet connection using an Internet Service Provider (ISP) and/or any other type of computer network. Network 230 may employ any type of data networking protocols, including transport control protocol and/or internet protocol (TCP/IP), user datagram protocol (UDP), Bluetooth, Bluetooth low energy (BLE), 802.11 compliant wireless local area network (WLAN), and/or any other wired or wireless LAN or WAN protocol.

Optionally, the one or more sensors 210 may be include weight sensor(s), length sensor(s), image sensor(s), barcode sensor(s), video recorder(s), gamma ray sensor(s), explosives sensor(s), radiation sensor(s), audible level sensor(s), hazardous material sensor(s) and/or any other type of sensor(s) that may collect security parameters from a container 213. Each sensor 210 generates an output signal corresponding to one or more parameter associated with container 213.

The output signal may be an analog signal, a digital signal, and/or a networking protocol signal adapted to communicating with I/O 220 and/or network 230.

Optionally, one or more to sensors 210 may be connected to one or more network interface device(s) which receives signals from one or more sensors 210 and transmits digital parameters to network 230 and/or to LUD HW Processor 221. The network interface device may comprise an analog to digital converter, a digital repeater, a digital data format converter, and/or any other device for receiving sensor signals and/or transmitting the digital parameters representative of the signals over a digital network. For example, sensor 210 may transmit signals on a Universal Serial Bus (USB) to the network interface device which may convert the protocol from USB data to Ethernet (IEEE 802.3). The network interface device may support all networking protocols that are supported by network 113 described below.

Optionally, the network interface device may be integrated within sensor 210, wherein the sensor parameters are transmitted to network 113 and/or to I/O 220.

Optionally, one or more sensor 210 may time stamp corresponding output signals. The time stamps may be integrated into the signals sensors 210 output, as described above, and stored in a computer record associated with the container, as described below. The time stamp may comprise both a time and a date.

Optionally, one or more sensors 210 are adapted to store a computer data file comprising digital parameters representative of the sensor outputs over a period of time, and are adapted to transmit the computer data file to storage 208, for example via network 230.

The values of the sensor parameters may be representative of for example length and/or weight of container 213, image files of container 213, an identification number, video files, and range bound parameters, for example a level of radiation, hazardous materials, and/or explosives and the like.

Optionally, sensor 210 is attached to mount 211 which is attached to container lifting mechanism 212. Mount 211 may comprise one or more rigid segment attachable at one end to sensor 210 and attachable at another end to container lifting mechanism 212.

Optionally, mount 211 comprises a connecting mechanism that allows multiple degrees of freedom for sensor 210 relative to container 213, allowing positioning sensor 210 in a variety of locations and/or orientations relative to container 213. The connecting mechanism may comprise one or more joints, ball joints, hinges, friction hinges, swing hinges, universal joints, constant velocity (CV) joints, and/or any other form of connecting mechanism that allows multiple degrees of freedom.

Optionally, mount 211 comprises multiple rigid segments, each segment attached to an adjoining segment with a connecting mechanism as described above.

Optionally, mount 211 comprises an electro-mechanical mechanism for positioning attached sensor 210 in a desired position relative to container 213. The electro-mechanical mechanism may be controllable by a remote user control interface and/or by a computerized automatic control mechanism.

Optionally, the computerized automatic control mechanism automatically positions sensor 210 in specific locations in order to collect sensor parameters, for example positioning an image sensor to record images of the door locking mechanism.

Optionally, the electro-mechanical mechanism allows moving sensor 210 through a range of positions as appropriate for specific sensor. For example, a video sensor may be moved around all sides of container 213 to record any external damage, and/or a hazardous materials sensor may be moved along all hinges and/or around all openings to test the air for presence of traces of hazardous materials.

Optionally, mount 211 is attachable to container lifting mechanism 212 by mechanical and/or chemical attachment, for example a bolt that is drilled into container lifting mechanism 212, a weld, a heat bond, an adhesive, and/or any other means of mechanical and/or chemical attachment.

Optionally, Sensor 210 is attachable directly to container lifting mechanism 212 by mechanical and/or chemical attachment, as described above.

Reference is now made again to FIG. 1. As shown in 101, process 100 begins as container 213 is being moved by shipping container lifting mechanism 212. Process 100 may be executed for example by LUD 200.

As shown in 102, optionally the identification number (ID) of container 213 is detected from characters printed on the exterior of container 213, as described below. The ID may be an ISO 6346 conform container number, a serial number, and/or any other number and/or text used to identify a container.

For example the ID may be detected by executing on LUD HW processor 221 an optical character recognition (OCR) code and/or video content analysis (VCA) code located in Parameter Analyzer module 201 to extract and analyze an image from a sensor parameter collected by an image sensor 213. Any other text on the exterior of container 213 may be detected as described above. As used herein, the term image refers to digital still images and/or video images.

Optionally, the ID of container 213 may also be detected by a user inputting the ID via I/O 220.

Once the ID is detected, a query is performed to determine whether the ID is present in a storage of records, for example by code instructions in Parameter Analyzer module 201 executing on LUD HW processor 221 which compares the detected ID with the IDs stored in records in memory 208 and/or the DBMS Module. The record may comprise the ID of container 213, sensor parameters, manifest parameters, and/or any other data associated with a container 213.

Optionally, manifest parameters that are printed on paper may be converted to a sensor parameter, for example a paper bill of lading (BOL) may be scanned by an image sensor and/or a computer scanner, and manifest parameters may be detected by OCR algorithm as described above.

Optionally, a plurality of records associated with a plurality of container IDs is received, for example from a network resource by I/O 220 via network 230 and/or from a user via I/O 220, which stores the received records in storage 208 and/or the DBMS module.

Optionally, the records may comprise metadata. Metadata may comprise an element of a signal output by sensor 213 as described above, for example a time stamp of each parameter and/or an identification of the sensor. Metadata may be received from a computer file, for example to I/O 220 via network 230 and/or from a user via I/O 220. Metadata may comprise identification of originating container port and/or specific container lifting unit, reports and/or alarms associated with container 213, identity of workers and/or managers who handled container 213, descriptions of any inspections performed, text entered by port personnel, digital images manually recorded by port personnel, a security category, mismatches between sensor and/or manifest parameters, and/or any other data associated with container 213.

Optionally, a user may change the detected ID and/or any other sensor parameter value in the record associated with container 213. For example, a user may detect via a display screen of I/O 220 that the detected ID does not match the ID as it appears on the exterior of container 213, and may use a keyboard of I/O 220 to change the value of the detected ID in the record.

When the ID is detected, a request for manifest parameters associated with the ID is transmitted, as described below in 107.

As shown in 103, optionally when the ID of container 213 is not detected, a new record is created and the ID of container 213 is added to the created record, for example by code instructions from Parameter Analyzer module 201 executing on LUD HW processor 221.

As shown in 104, optionally when the ID of container 213 is detected, the sensor parameters and/or manifest parameters associated with container 213 ID are added to the existing record, for example by code instructions from Parameter Analyzer module 201 executing on LUD HW processor 221.

As shown in 105, optionally one or more sensors 210 captures one or more sensor parameters associated with container 213. As described above, sensor 210 may transmit the captured parameters as corresponding signals via network 230 to LUD HW Processor 221.

As shown in 106, optionally manifest parameters are received. For example, code instructions from Parameter Analyzer module 201 executing on LUD HW processor 221 may instruct transmitting a query requesting manifest parameters for associated with container 213 ID via network 230 to a Central Unit 500 and/or Port Unit 550 as described below in FIG. 5. The requested manifest parameters are received and stored in records corresponding to the appropriate ID, for example stored by I/O 220 in storage 108.

Manifest parameters may comprise any historical parameters associated with container 213, for example a shipment certificate, a shipping registry, BOL, a seaward waybill, an electronic bill of lading (eB/L), shipping history, proof of ownership, an ID, a manifest of contents, identity of recipients, identity of senders, a shipping company responsible for delivering container 213 between any two points in the shipping history, metadata, historical data, and/or any other parameters descriptive of container 213, the contents of container 213, and/or the shipping of container 213.

Optionally, prior to container 213 being lifted by container lifting mechanism 212, LUD HW Processor 221 may receive a notification that a container ID is scheduled to arrive in the future, and respond by transmitting a request to network resources to receive manifest parameters, for example by code from Parameter Analyzer module 201 executing on LUD HW processor 221. For example, LUD HW Processor 221 may receive input from I/O 220 that a specific container ID is scheduled to arrive in a week, and in response to this notification send a request, for example a Port Unit 550 and/or a Central Unit 500 as described below, for manifest parameters associated with the specific container ID.

As shown in 107, optionally the sensor parameters and/or manifest parameters are analyzed, for example by code in Parameter Analyzer module 201 executing on LUD HW processor 221. The analysis may comprise extracting images from parameters and detecting text from the image as described above, comparing images extracted from parameters as described below, detecting mismatches between values of parameters and expected values as described below, and/or detecting mismatches between values of parameters, as described above.

Optionally, expected values, ranges of values, thresholds, minimum values, and/or maximum values for sensor and/or manifest parameters may be received, for example by input from a user via I/O 220 and/or received as a computer file via I/O 220.

When the value of the detected mismatch is greater than a user defined value, the mismatch may be an input to calculating a correlation, as described below.

A mismatch may be detected between the value of a sensor parameter and a user defined expected value, for example between a value of a sensor parameter representative of the levels of hazardous materials of container 213 and a user defined maximum value.

A mismatch may be detected between the value of a manifest parameter and a user defined expected value, for example between a value of a manifest parameter representative of the weight of the container 213 and a user defined maximum value.

Optionally, the analysis may comprise analyzing and/or comparing images of container 213, for example by code instructions for image processing and/or VCA in Parameter Analysis module 201 executing on LUD HW processor 221. An image extracted from a sensor parameter and an image extracted from a manifest parameter may be compared, for example by comparing images extracted from a sensor parameter image and a corresponding manifest parameter image of a seal, a door, and/or any other component of container 213, a mismatch between the images may be detected, indicating a possibility of tampering.

In a similar manner described above two or more images extracted from two sensor parameter and an image extracted from manifest parameters may be compare, and/or two or more images extracted from sensor parameters may be compared.

As shown in 108, optionally security categories are calculated from correlations between sensor parameters, manifest parameters, and/or detected mismatches are calculated, for example by code instructions in Classifier Calculator module 203 executing on LUD HW processor 221.

Classifier Calculator module 203 may comprise code instructions for calculating correlations by one or more member of a list of techniques comprising statistical classification, correlation, linear regression, logistic regression, linear discriminant analysis, non-linear regression, and comparing an expected range of values with the mismatch. The output of the correlation calculation may be a report and/or a security category as described above.

For example, a user may input a classifier algorithm and/or security categories, for example via I/O 220 and/or received as a computer file via I/O 220.

Optionally, the classifier algorithm may assign weights to different inputs, for example a sensor parameter indicating a dangerously high level of radioactive material may have more influence on the security category and/or reports than a mismatch between manifest and sensor parameter images indicating a possibility of tampering. The weights for inputs to the classifier algorithm may be input by user via I/O 220 and/or via network 230 as described above.

Optionally, the security category is a type of report and/or alarm, where user input determines thresholds, recipients, triggers, and all other aspects of LUD 200 behaviors associated with reports, as described below.

As shown in 109, a detected mismatch is transmitted, for example by code instructions in Reports Generator module 202 executing on LUD HW processor 221 instructing I/O 220 to transmit the mismatch to a specific user defined network address, as described above.

Optionally, reports, security categories, and/or alarms are generated and stored, for example in storage 208 and/or the DBMS module by code instructions in Reports Generator module 202 executing on LUD HW processor 221. Inputs to generate the alarms and/or reports may comprise the security category, manifest and/or sensor parameters, detected mismatches, user defined thresholds for mismatches, user defined reports for specific recipients, and/or user defined content for reports to specific recipients.

For example, the following reports may be generated, where each report is designated for a specific person, and the contents of the report comprises user defined relevant to that persons role regarding container 213, as described above.

A report designated for a port worker may comprise container images, weight, dimensions, color, ID, and/or any detected mismatch(es) associated with container 213.

A report designated for a customs worker may comprise a list of container 213 contents according to customs categories, a record of taxes and/or customs duties paid, all from manifest parameters.

A report designated for security personnel may comprise manifest and/or sensor parameters and/or specified detected mismatch(es), including weight, size, color, and/or levels of radiation, hazardous materials and/or explosives.

Alarm(s) may be generated according to user defined input, as described above.

An alarm may comprise a pre-recorded voice message delivered to a designated phone number, a cell phone message such as a SMS, a message delivered to a wireless device such as a Smartphone, a message delivered by an instant messaging program (IM) such as Gmail chat, a report, and the like.

Optionally, an audible alarm and/or lighting mechanism may be activated when user defined events occur. For example, LUD 200 may comprise a siren and/or strobe light. When a radioactive level is detected above a user defined threshold, the siren alarm and/or strobe light are automatically turned on by code instructions in Reports Generator module 202 executing on LUD HW processor 221.

Alarm(s) and/or report(s) may be transmitted to a user located outside the vicinity of LUD HW Processor 221, for example via network 230 to a public and/or intranet network address.

Optionally, the generated reports, security categories, and/or alarms may be transmitted to designated recipients. For example, code instructions in Reports Transmitter module 204 executing on LUD HW processor 221 may copy reports and/or alarms from storage 208 and/or the DBMS module and present each alarm and/or report, together with a computer network address for the designated recipient, to I/O 220 for transmission on network 230.

Optionally, a subset of sensor and/or manifest parameters, detected mismatches, alarms, and/or reports may be transmitted to a DBMS for storage and/or future retrieval, for example to a Central Unit 500 and/or a Port Unit 550 as described below.

Optionally, reports, security categories, and/or alarms may be transmitted to remote users. For example, reports and/or alarms may be transmitted via network 230 to the shipping company security officer who is located in a different country from LUD 200.

Figure 3:
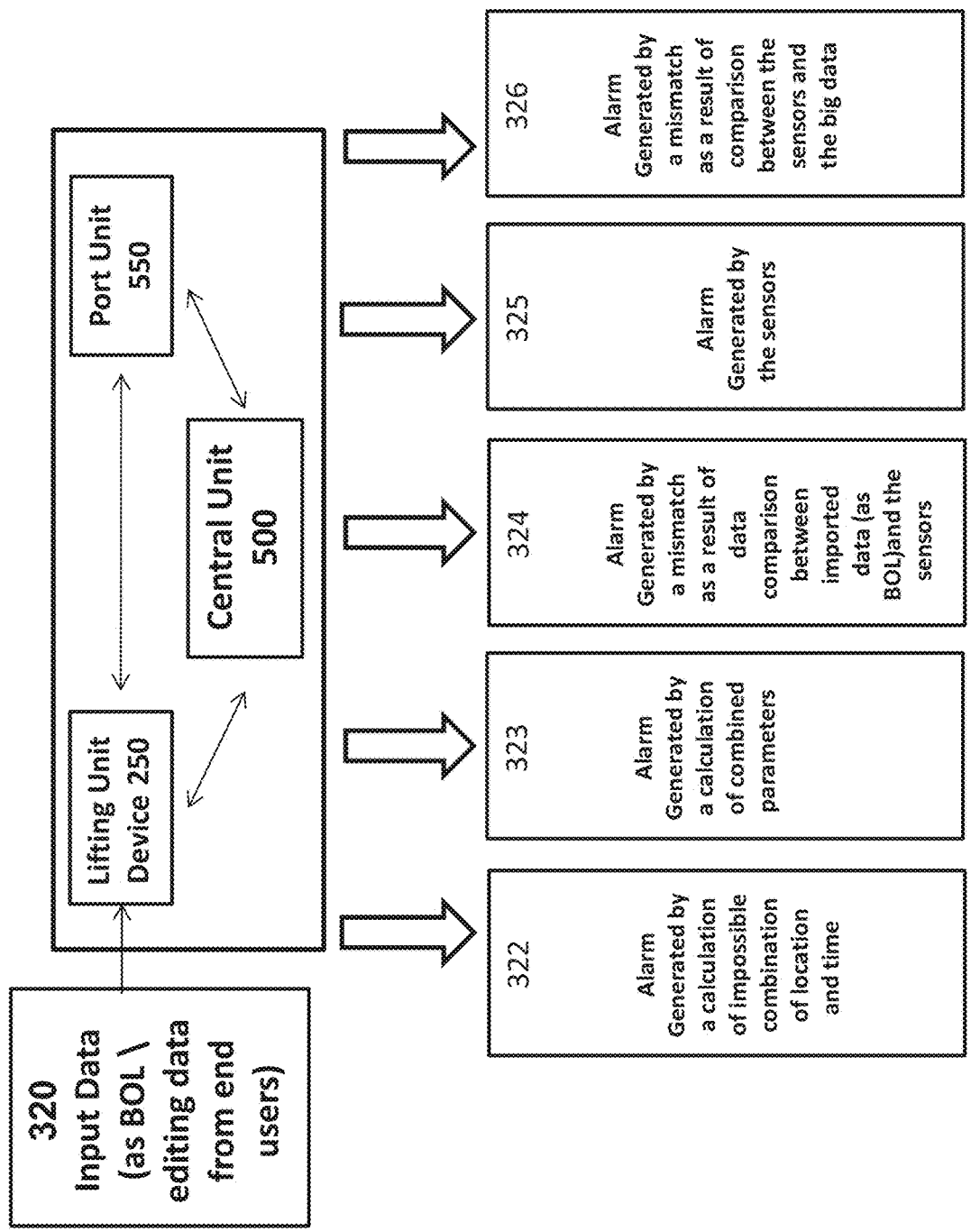
FIG. 3 is a schematic illustration of information flow for generating alarms in another embodiment of the system for inspecting containers in FIG. 1, according to some embodiments of the present invention.

Reference is now made to FIG. 3, a schematic illustration of information flow between LUD 200, Central Unit 500, and Port Unit 550. Arrows in FIG. 3 represent flow of information.

As shown in 320, inputs for alarms, security categories, and/or reports as described above in 109 are received and processed by LUD HW Processor 221 as described above, and/or Port Unit 550 and/or Central Unit 500 as described below. The following alarms may be generated, as described above in 109.

As shown in 322, an alarm may be generated when a mismatch is detected between the locations of container 213 on two different dates. For example, when a container ID is detected as described above in 102 on a certain date, manifest parameters may be searched for previous locations and date combinations, and the amount of elapsed time between each location may be compared to a user defined table of travel time between the locations. A mismatch may cause an alarm to be generated.

As shown in 323, an alarm may be generated when a specific combination of mismatches are detected. For example, when two mismatches are detected between manifest parameters and data derived from sensor parameters, an alarm may be generated. In this example, a single mismatch would not cause an alarm to be generated.

As shown in 324, an alarm may be generated when a mismatch is detected between a value of a sensor parameter and a value of a manifest parameter, for example between a value of a sensor parameter representing the weight of container 213 and a value of a manifest parameter representing the weight of container 213. In this example, the manifest parameter originated from a BOL, but it may also originate from a seaward waybill, an electronic bill of lading (eB/L), and/or any other manifest parameters of container 213.

As shown in 325, an alarm may be generated when a mismatch is detected between a value of a sensor parameter and a user defined expected value, for example as described above in 107 when the value of a sensor parameter for the levels of hazardous materials of container 213 is greater than a user defined maximum value.

As shown in 326, an alarm may be generated when a mismatch is detected between a sensor parameter and a manifest parameter received from a DBMS, for example a DBMS in Central Unit 500 and/or Port Unit 550.

Figure 4:
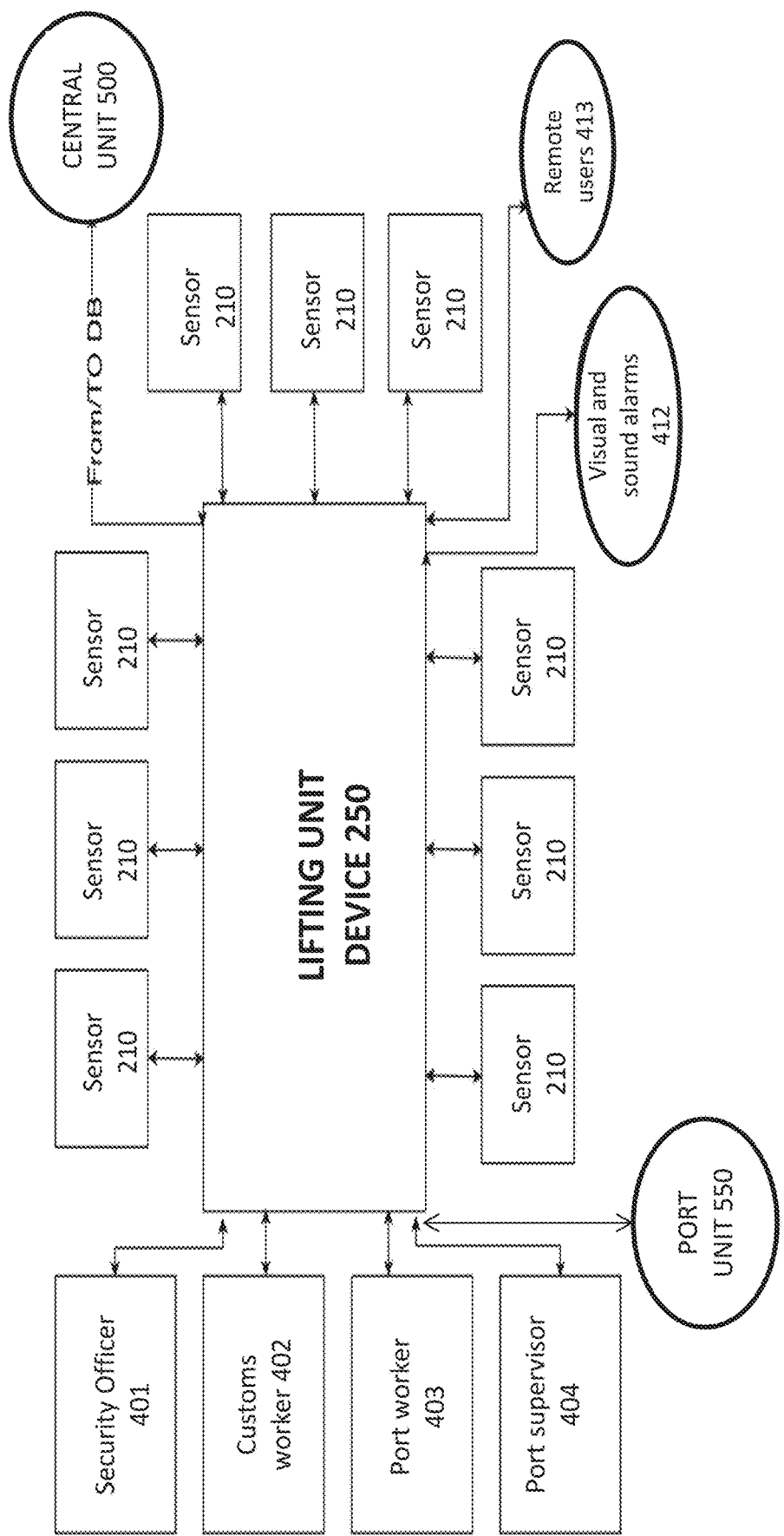
FIG. 4 is a schematic illustration of another embodiment of the system shown in FIG. 2, according to some embodiments of the present invention.

Reference is now made to FIG. 4, a schematic illustration of another embodiment of LUD 200, according to some embodiments of the current invention. As shown in FIG. 4, all lines with arrows represent communications connections, for example as described in network 230 above. Security officer 401, customs worker 402, port worker 403, and/or port supervisor 404 are all communications devices with a computer network address associated with the exemplary respective user.

As shown in 500, a subset of sensor and/or manifest parameters, detected mismatches, alarms, security categories, and/or reports are transmitted to and/or received from Central Unit 500, as described below. As shown in 550, a subset of sensor and/or manifest parameters, detected mismatches, alarms, security categories, and/or reports are transmitted to and/or received from Port Unit 550, as described below.

As shown in 412, visual and/or sound alarms are activated as described above. As shown in 413, reports and/or alarms are transmitted to external users, as described above.

Figure 5:
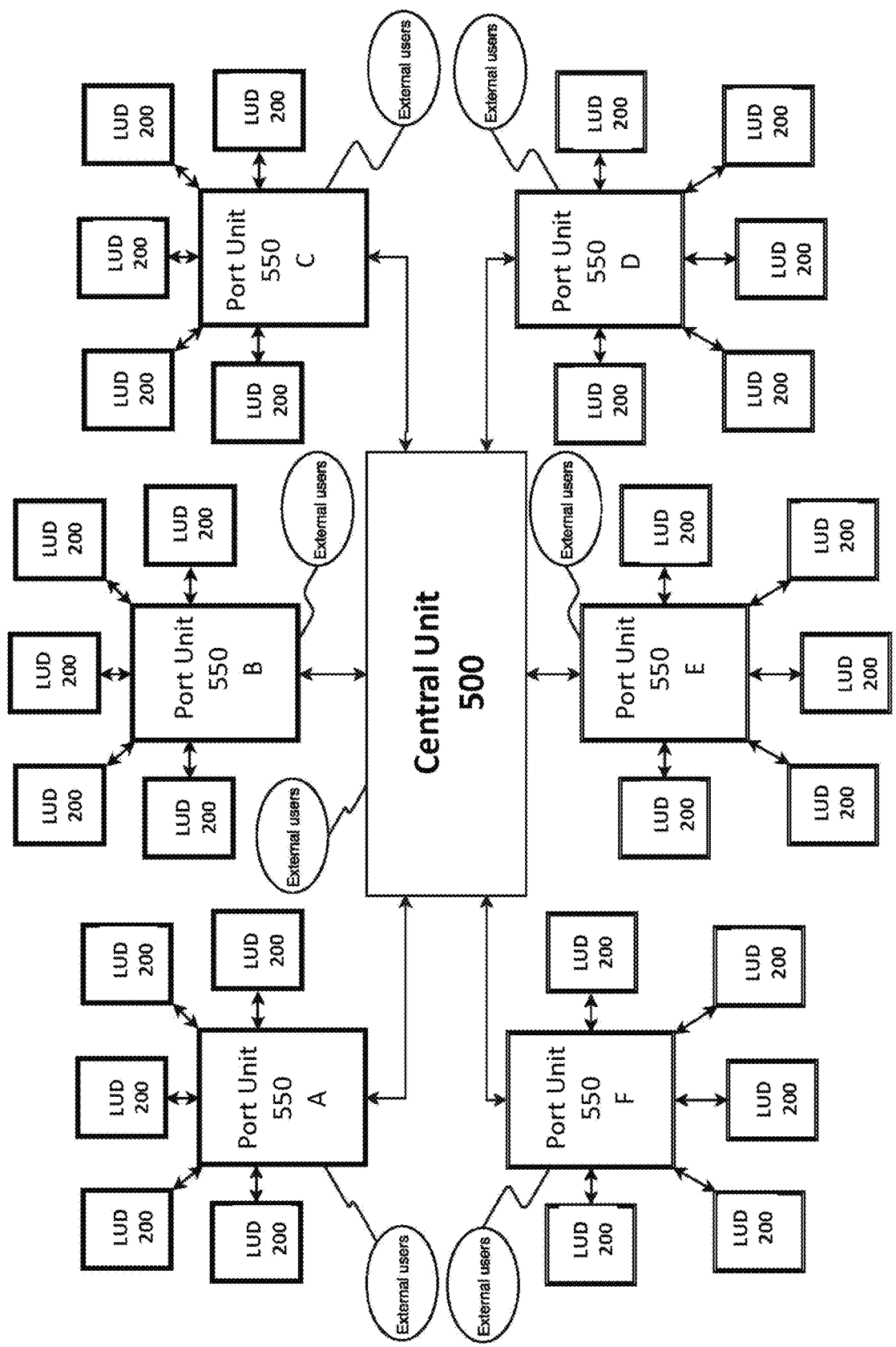
FIG. 5 is a schematic illustration of a system for collecting, storing, and distributing parameters and metadata associated with shipping containers, according to some embodiments of the present invention.

Reference is now made to FIG. 5, a schematic illustration of connections between Central Unit 500, Port Unit 550, and LUD 200, according to some embodiments of the current invention. Central Unit 500 is adapted to collecting, storing, and/or transmitting parameters associated with container 213 to and/or from a plurality of LUD 200. The parameters may comprise sensor parameters, manifest parameters, detected mismatch(es), security categories, and/or any other parameters associated with container 213.

As shown in FIG. 5, all lines with arrows represent communications connections, for example as described in network 230 above.

Central Unit 500 comprises one or more LUD HW processor 221 as described above, computer storage 208 as described above, and an I/O 220 as described above. Code instructions software modules and for a DBMS are stored in storage 208, as described above. The DBMS code instructions when executing on LUD HW processor 221 are adapted to receive, store, and/or transmit sensor parameters associated with shipping containers 213. Optionally, the DBMS code instructions when executing on LUD HW processor 221 is further adapted to receive, store, and/or transmit manifest parameters, mismatches, reports, alarms, and/or any other data associated with container 213.

As shown in 450, Port Unit 450 is an instance of Central Unit 500 that is located at a specific port, for example at the port of Hamburg or the port of Toulouse, and is connected to one or more LUD HW Processor 221 located in a geographical proximity to the Port Unit 550, for example within the respective port.

Optionally, some or all LUD 200 communicates with a Port Unit 550 via network 230 as described above, which in turn communicates with a Central Unit 500 via network 230 as described above.

Optionally, Port Unit 550 may request from Central Unit 500 manifest parameters associated with containers that are scheduled to arrive in the future at the corresponding port, as described above in 107.

Optionally the DBMS of LUD 200, Port Unit 550, and Main Unit 500 comprise instances of a distributed DBMS. Optionally, the entities LUD 200, Port Unit 550, and/or Central Unit 500 each transmit one to the other records associated with containers 213, for example, in a database replication process of a DBMS as is known in the art, where portions of the database relevant to each entity are received by the entity, so that multiple copies of the records may be stored in multiple locations.

Optionally, sensor parameters received by Central Unit 500 may be categorized as manifest parameters once stored in a DBMS or any other storage system, for example by code instructions in Parameter Analyzer module 201 executing on LUD HW processor 221.

Central Unit 500 may receive parameters associated with container 213 from other instances of Central Unit 500, LUD 200, Port Unit 550, and/or network resources.

Optionally, the quantity of sensor and/or manifest parameters stored in Central Unit 500 may comprise big data, where the use of predictive analytics, user behavior analytics, and/or other advanced data analytics methods may be employed to analyze the data, for example by code instructions in Classifier Calculator module 203 and executing on LUD HW processor 221. For example, the analytic methods mentioned above may be employed to detect trends over time in security hazards for a specific port and/or shipping company, a correlation between combinations of ports and/or shipping companies and a probability of a security hazard, a geographical area comprising multiple ports that have elevated security hazards, and the like.

Figure 6:
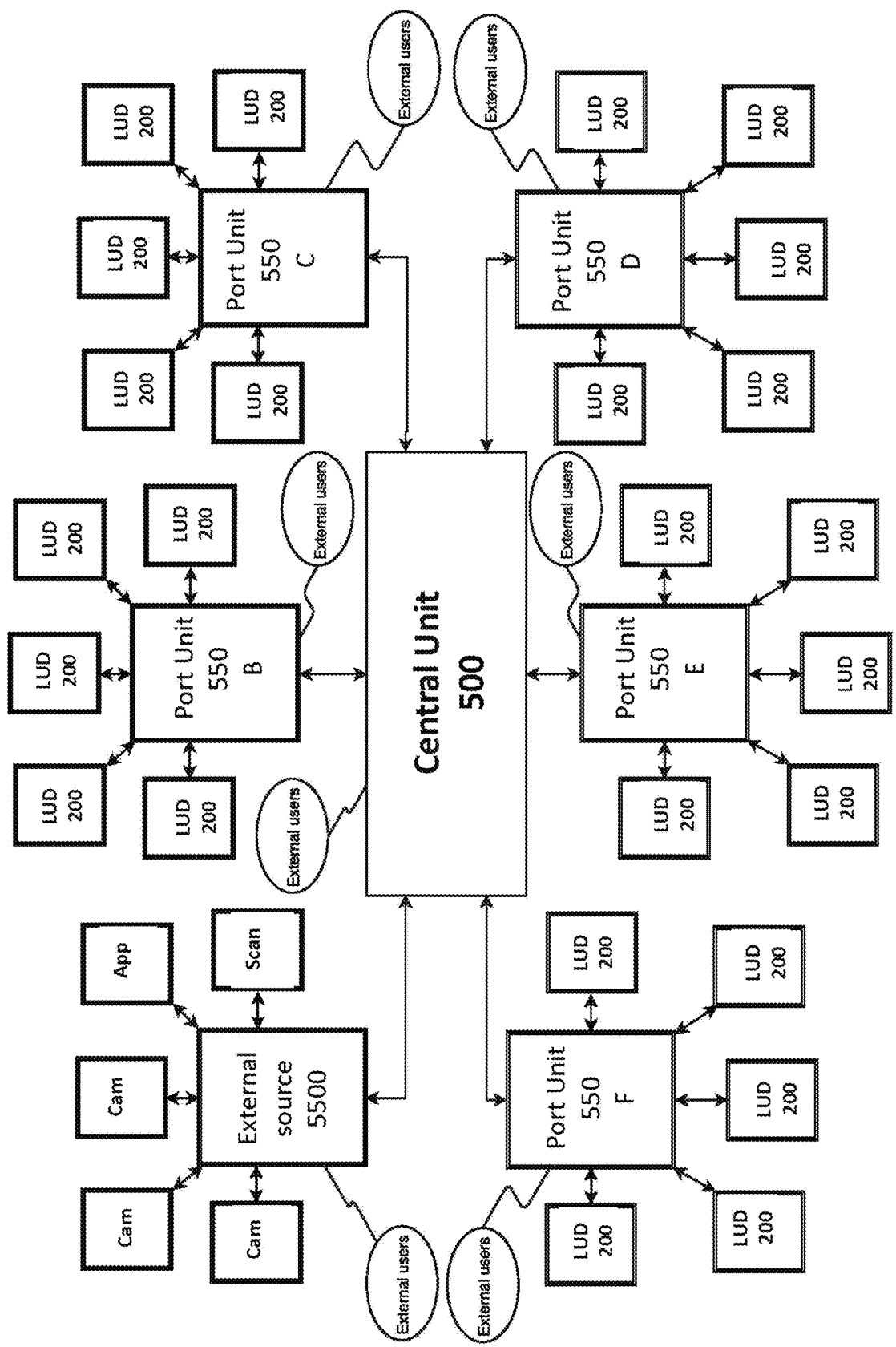
FIG. 6 is a schematic illustration of a system for collecting, storing, and distributing parameters and metadata associated with shipping containers and connected to external tracking sources, according to some embodiments of the present invention.

Reference is now also made to FIG. 6 which is a schematic illustration of a system for collecting, storing, and distributing parameters and metadata associated with shipping containers and connected to external tracking sources, according to some embodiments of the present invention. The numerals indicating objects are similar to the one described above, however the system further connected to an external tracking source 5500 that receives inputs from exemplary sources such as cameras, applications, scanners and/or the like. According to these embodiments of the present invention, data collected from external tracking sources such as one or more port unit(s) is correlated with data originates from other one or more port unit(s) and/or external tracking sources 5500 such as external systems for calculating a geographical transport route for each one of the containers. In such embodiments, data regarding each container may be logged to and/or coordinated in a global database, either centralized or distributed. For example the database may include a plurality of unique records, each associated with a different container identifier (e.g. set of characters, a barcode image, etc.). The geographical transport route may be maritime, aerial, territorial and/or a combination thereof. The current geographical transport route which is calculated per container may be matched with an estimated geographical transport route given or calculated for the container, for instance based on target address, BOL analysis and/or the like.

Optimally, container(s) are identified by analyzing images captured using external tracking source 5500 which are connected or include various imaging systems which are geographically distributed in various areas, optionally worldwide. For example, the images may be captured by toll roads cameras (e.g. marked as cam), vehicle sensors, such as ship deck sensors, a track carrier sensor, street cameras, paper bill of lading (BOL) scanners (e.g. marked as scan), and/or by cameras of mobile devices executing an application facilitating users to upload images of containers (e.g. marked as App). Other container detector schemes may be based on readings of tag readers such as Bluetooth tag readers, Near Field Communication (NFC) tag readers. As used herein, vehicle sensors such as track carrier sensor(s) or ship deck sensor(s) are sensors mounted on vehicles for detecting a presence of a container. For example, the sensor may be an NFC tag reader, a camera, and/or a scanner mounted on a container carrying vehicle such as a ship or track or a plane for detecting the identity of a container carried by the respective vehicle.

In use, images are analyzed to identify various container identifiers, such as container machine readable identifiers (e.g. a barcode, a Quick Response (QR) code etc.). Then, the container identifier is used for searching a record to update with container information, such as location, detected color, detected weight, detected status (e.g. open, closed, etc.) and/or the like. The logged data can then be analyzed to deduce a geographical route of each container, a current estimated location of each container, a current status or change of status per container etc.

Optionally, the geographical route by a combination data from the LUDs with an external tracking source 5500 such as a Windward™ service or any other maritime data platform that tracks the movement of ships worldwide. In such embodiments, movement of a container may be estimated or tracked by correlating between each container and ship(s) indicated as carrying the container, for example in the respective BOL, and deriving the geographical route of the container from the route of the ship(s).

In an exemplary case, a route of a container is deduced from analyzing a BOL captured on a first time frame, presence indications from 2 different port units 550, a presence of the barcode of the container in an image captured by a tool road camera, a presence of the barcode of the container in an image captured by a street camera, and a reading of an NFC tag in proximity to an NFC reader. In another exemplary case, a route of a container is deduced from analyzing a presence indications from 2 different port units 550, an input of a track driver to a designated application, either using a QR scanner or a manual input, a presence of the barcode of the container in images captured by different tool road cameras and a presence of the barcode of the container in an image captured by a street camera.

In use, the calculated geographical route of each container may be matched with target address given to the container to detect or estimate mismatch and generate an alert accordingly. Additionally or alternatively in use, parameters extracted from images and/or other sensors may be matched with estimated parameters of each container, for example estimated status, estimated weight or estimated color. This allows detecting irregularities automatically, for instance a change in color, a premature opening of the container and/or the like. This also allows presenting an estimated current location based on the data which is logged per container. This also allows identifying duplications of container identifiers and generates alerts accordingly (e.g. when the same ID is detected in different locations or twice in the same location).

The system in FIG. 6 may be used for implementing a method for correlating between a geographic route of a container and a target route for detecting irregularities as described above, for instance by the central unit 500. The method is based on receiving one or more geographical target addresses given to a container (e.g. from an analysis of the BOL), identifying port location(s) of the container in port(s) by analyzing port sensor output(s) of port sensor mounted on container lifting mechanism(s) (e.g. the LUDs). This allows identifying terrestrial location presence of the container by analyzing terrestrial sensor outputs of terrestrial sensors mounted to monitor a member of a group consisting of a road, a street and storage. The terrestrial sensor outputs may be images or video files of cameras as described above. Based on this information, a geographical route may be calculated according to the port location(s) and terrestrial location(s) and irregularity(ies) can be detected based on an analysis of the geographical route and the geographical target address. The method may be combined with any of the above described systems and methods for facilitating irregularity detection based on a combination of data from the LUDs and from external sources. Optionally the system may be used for providing a dashboard presenting indications each of a location estimation of a container of a company or any other entity, for example for containers owned or associated with a certain company having a plurality of containers or load in a plurality of containers. As the above system receives data about the location of containers at ports, ships, tracks and/or the like the estimated location of different containers may be presented on a graphical user interface to an operator. The display maybe as a dot on a route depicted on a map and/or as a log indicating the last location identified by the system. The tracking is done both in the sea, in the air and/or on the ground.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant sensors will be developed and the scope of the term sensor is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "one or more compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A system adapted to collect security parameters from a shipping container while a container lifting mechanism is lifting and moving said container, comprising:
   a mount adapted to attach at least one sensor to a container lifting mechanism, wherein said at least one sensor is adapted to capture at least one sensor parameter associated with a shipping container while said container lifting mechanism lifts said shipping container;
   a network interface adapted to receive over a network at least one manifest parameter associated with said shipping container and at least one remote location sensor parameter captured by at least one additional sensor other than said at least one sensor at a location remote from a whereabouts of said container lifting mechanism, wherein said at least one remote location sensor parameter comprising at least one value representing a physical property of said shipping container during capturing thereof and being associated with said shipping container responsive to said at least one additional sensor capturing an identifier of said shipping container;
   at least one hardware processor adapted to execute code for detecting an irregularity based on data deduced from an analysis of said at least one sensor parameter, said at least one manifest parameter and said at least one value comprised in said at least one remote location sensor parameter, and
   outputting a signal indicative of said irregularity.

2. The system of claim 1, wherein said hardware processor is further adapted to execute code for correlating said irregularity with a security category, wherein said correlation is calculated by at least one member of a list of techniques comprising statistical classification, correlation, linear regression, logistic regression, linear discriminant analysis, non-linear regression, and comparing an expected range of values with said detected irregularity.

3. The system of claim 1, wherein said hardware processor is further adapted to execute code for a database management system (DBMS) adapted to storing and instructing transmitting of at least one of said at least one sensor parameter and said at least one remote location sensor parameter.

4. The system of claim 1, wherein at least one of said at least one sensor and said at least one remote location sensor comprises at least one member of a group consisting of weight sensors, length sensors, image sensors, barcode sensors, video recorders, gamma ray sensors, explosives sensors, radiation sensors, and hazardous material sensors, and wherein at least one of said at least one sensor parameter and said at least one remote location sensor parameter comprises parameters captured by a corresponding said at least one member.

5. The system of claim 1, wherein said analysis comprises at least one member of a list of analysis techniques comprising calculating at least one discrepancy between a value of said at least one sensor parameter and an expected range of values, calculating at least one discrepancy between a value of said at least one manifest parameter and an expected range of values, image processing, video content analysis (VCA), and optical character recognition (OCR).

6. The system of claim 1, wherein said irregularity comprises a discrepancy between said deduced data and said at least one manifest parameter greater than an expected value.

7. The system of claim 1, wherein said at least one manifest parameter comprises at least one of a list of parameters associated with said shipping container consisting of a subset of said at least one sensor parameter, shipping history, owner of said container, an identification number, owner of a contents of said container, a manifest of contents, identity of receivers, identity of senders, a shipping company responsible for delivery between any two points in said shipping history, and any other parameters associated with said shipping container.

8. The system of claim 1, wherein said hardware processor is further adapted to execute code for detecting a mismatch between data deduced from said analysis of said at least one manifest parameter and said analysis of said at least one sensor parameter.

9. The system of claim 1, wherein said hardware processor is further adapted to execute code for detecting a mismatch between data deduced from said analysis of a plurality of said at least one manifest parameters.

10. The system of claim 1, wherein said hardware processor is further adapted to execute code for detecting a mismatch between data deduced from said analysis of a plurality of said at least one sensor parameters.

11. The system of claim 1, wherein said mount comprises a connecting arm wherein a distal end is attached to said at least one sensor, and a proximal end is attached to said container lifting mechanism.

12. The system of claim 1, wherein said mount provides at least one degree of freedom between said at least one sensor and said container lifting mechanism.

13. The system of claim 1, wherein said mount comprises an electro-mechanical mechanism which automatically positions said sensor in proximity to at least one optimal position for detecting at least one said sensor parameter.

14. The system of claim 1, wherein said mount automatically moves said sensor through a range of positions and orientations relative to said container lifting mechanism.

15. The system of claim 1, wherein said mount is controlled remotely by a user utilizing a controller interface.

16. A system for collecting, storing, and distributing security parameters associated with a shipping container comprising:
   at least one computing processor comprising:
   a network interface adapted to receive over a network at least one sensor parameter from at least one sensor mounted on at least one container lifting mechanism, at least one manifest parameter associated with said shipping container and at least one remote location sensor parameter captured by at least one additional sensor other than said at least one sensor at a location remote from a whereabouts of said container lifting mechanism, wherein said at least one remote location sensor parameter comprising at least one value representing a physical property of said shipping container during capturing thereof and being associated with said shipping container responsive to said at least one additional sensor capturing an identifier of said shipping container;
   at least one hardware processor adapted to execute code instructions, said code instructions comprising a database management system (DBMS); and
   said DBMS adapted to receive queries for data associated with said shipping container, and to respond with at least one of said at least one sensor parameter and said at least one value comprised in said at least one remote location sensor parameter.

17. The system of claim 16, wherein at least one of said at least one sensor and said at least one remote location sensor comprises at least one member of a group consisting of weight sensors, length sensors, image sensors, barcode sensors, video recorders, gamma ray sensors, explosives sensors, radiation sensors, and hazardous material sensors, and wherein at least one of said at least one sensor parameter and said at least one remote location sensor parameter comprises parameters captured by a corresponding said at least one member.

18. The system of claim 16, wherein said at least one manifest parameter comprises at least one of a list of parameters associated with said shipping container consisting of a subset of said at least one sensor parameter, shipping history, owner of said container, an identification number, owner of a contents of said container, a manifest of contents, identity of receivers, identity of senders, a shipping company responsible for delivery between any two points in said shipping history, and any other parameters associated with said shipping container.

19. The system of claim 16, further comprising code instruction for detecting an irregularity based on data deduced from an analysis of said at least one sensor parameter, said at least one manifest parameter and said at least one remote location sensor parameter.

20. A method for collecting security parameters from a shipping container while a container lifting mechanism is lifting and moving said container, comprising:
   mounting at least one sensor to a container lifting mechanism, wherein said at least one sensor is adapted to capture at least one sensor parameter associated with a shipping container while said container lifting mechanism lifts said shipping container;
   receiving said at least one sensor parameter;
   receiving over a network at least one manifest parameter associated with said shipping container and at least one remote location sensor parameter captured by at least one additional sensor other than said at least one sensor at a location remote from a whereabouts of said container lifting mechanism, wherein said at least one remote location sensor parameter comprising at least one value representing a physical property of said shipping container during capturing thereof and being associated with said shipping container responsive to said at least one additional sensor capturing an identifier of said shipping container;
   detecting an irregularity based on data deduced from an analysis of said at least one sensor parameter, said at least one manifest parameter and said at least one value comprised in said at least one remote location sensor parameter, and
   outputting a signal indicative of said irregularity.

* * * * *